US007089537B2

(12) United States Patent
Das et al.

(10) Patent No.: US 7,089,537 B2
(45) Date of Patent: Aug. 8, 2006

(54) SYSTEM AND METHOD FOR PERFORMING PATH-SENSITIVE VALUE FLOW ANALYSIS ON A PROGRAM

(75) Inventors: Manuvir Das, Kirkland, WA (US);
Stephen R. Adams, Seattle, WA (US);
Nurit Dor, Rannana (IL)

(73) Assignee: Microsoft Corporation, Redmond, WA (US)

( * ) Notice: Subject to any disclaimer, the term of this patent is extended or adjusted under 35 U.S.C. 154(b) by 540 days.

(21) Appl. No.: 10/662,942

(22) Filed: Sep. 15, 2003

(65) Prior Publication Data

US 2005/0060691 A1   Mar. 17, 2005

(51) Int. Cl.
*G06F 9/44* (2006.01)
(52) U.S. Cl. ............... 717/132; 717/126; 717/127; 717/131
(58) Field of Classification Search ............. 717/126, 717/124, 131, 132, 127; 712/201
See application file for complete search history.

(56) References Cited

U.S. PATENT DOCUMENTS

| 5,119,290 | A  | * | 6/1992  | Loo et al. ............... 711/210 |
| 5,222,244 | A  | * | 6/1993  | Carbine et al. ............ 712/41 |
| 6,128,775 | A  | * | 10/2000 | Chow et al. ............. 717/156 |
| 6,202,202 | B1 | * | 3/2001  | Steensgaard ............. 717/127 |
| 6,317,134 | B1 | * | 11/2001 | Hagemark et al. ........ 345/542 |
| 6,327,699 | B1 | * | 12/2001 | Larus et al. ............. 717/128 |
| 6,457,023 | B1 | * | 9/2002  | Pinter et al. ............. 707/206 |
| 6,813,761 | B1 | * | 11/2004 | Das et al. ............... 717/132 |
| 6,970,985 | B1 | * | 11/2005 | Moritz .................. 711/154 |
| 6,986,126 | B1 | * | 1/2006  | Kosche et al. ............ 717/126 |

OTHER PUBLICATIONS

TITLE: An incremental Flow- and Context-sensitive Pointer Aliasing Analysis, author: Yur et al, ACM, 1999.*
TITLE: Flow-Sensitive Type Qualifiers, author: Foster et al, ACM, 2002.*
Aiken, et al., "Checking and Inferring Local Non-Aliasing", Proceedings of the ACM SIGPLAN, Conference on Programming Language Design and Implementation, pp. 129-140, 2003.
Bodik, et al., "Path-Sensitive Value-Flow Analysis", Conference Record of the Twenty-Fifth ACM Symposium on Principles of Programming Languages, pp. 237-251, 1998.

(Continued)

*Primary Examiner*—Chameli C. Das
(74) *Attorney, Agent, or Firm*—Lee & Hayes PLLC

(57) ABSTRACT

Described is a method and system for performing path-sensitive value flow analysis on a software program. Concrete state and value alias information is tracked along each statement and each relevant path in an abstract program and is stored as a symbolic state in a symbolic store. The value alias information includes a first set of aliases that identify aliases for a designated value that is being analyzed and a second set of aliases that identify possible aliases for the designated value. The value alias information is obtained using imprecise memory alias analysis. Along each relevant path for each statement, transforms are applied to the sets of aliases to update the first and second sets of aliases. The transforms are applied based on the type of statement being processed. Symbolic states existing at the same location are merged if the value alias information is identical within the symbolic states.

45 Claims, 10 Drawing Sheets

OTHER PUBLICATIONS

Bozga, et al., "Storeless Semantics and Alias Logic", Proceedings of the 2003 ACM SIGPLAN Workshop on Partial Evaluation and Semantics-Based Program Manipulation, pp. 55-65, Jun. 2003.

Bush, et al., "A Static Analyzer for Finding Dynamic Programming Errors", Software- Practice and Experience, vol. 30, No. 7, pp. 775-802, 2000.

Ball et al., "Automatically Validating Temporal Safety Properties of Interfaces", Proceedings of SPIN '01, 8th Annual SPIN Workshop on Model Checking of Software, May 2001.

Chatterjee, et al., "Relevant Context Interface", Conference Record of the Twenty-Sixth ACM Symposium on Principles of Programming Languages, pp. 133-146, 1999.

Manuvir Das, "Unification-Based Pointer Analysis with Directional Assignments", Proceedings of the ACM SIGPLAN 2000, Conference in Programming Languages Design and Implementation, 2000.

Deline, et al., "Enforcing High-Level Protocols in Low-Level Software", Proceedings of the ACM SIGPLAN 2001 Conference on Programming Language Design and Implementation, 2001.

Das, et al., "Estimating the IMpact of Scalable Pointer Analysis on Optimization", 8th International Symposium on Static Analysis, 2001.

Das, et al., "Esp: Path-Sensitive Porgram Verification in Polynomial Time", Proceedings of the ACM SIGPLAN 2002 Conference on Programming Langue Design and Implementation, 2002.

Flanagan, et al, "Extended Static Checking for Java", Proceedings of the ACM SIGPLAN 2002 Conference on Programming Language Design and Implementation, 2002.

Foster, et al., "Flow-Sensitive Type Qualifiers", Proceedings of teh ACM SIGPLAN 2002 Conference on Programming Language Design and Implementation, 2002.

Hallem, et al., "A System and Language for Building System-Specific, Statis Analysis", Proceedings of the ACM SIGPLAN 2002 Conference on Programming Language Design and Implementation, 2002.

Michael Hind, "Pointer Analysis: Haven't We Solved This Problem Yet?", Proceedings of the 2001 ACM SIGPLAN-SIGSOFT Workshop on Program Analysis For Software Tools and Engineering (PASTE '01), pp. 54-61, 2001.

Hind et al., "Evaluating the Effectiveness of Pointer Alias Analyses", Science of Computer Programming, vol. 39, No. 1, pp. 31-55, Jan. 2001.

Horwitz, et al., "Interprocedural Slicing Using Depedence Graphs", ACM Trans. Program, Lang. Syst., vol. 12, No. 1, pp. 26-60, Jan. 1990.

Heintze, et al., "Ultra-Fast Aliasing Analysis Using CLA" A Million Lines of C Code in a Second, Proceedings of the 2001 ACM SIGPLAN Conference on Programming Language Design and Implementation, pp. 254-263, 2001.

Jones, et al., "Flow Analysis and Optimization of LISP-Like Structures", Conference Record of the Fourth ACM Symposium on Principles of Programming Languages, pp. 244-256, 1979.

Khedkar, et al., "A Generallsed Theory of Bit Vector Data Flow Analysis", ACM Trans. Program. Lang. Syst., vol. 16, No. 5, pp. 1472-1511, 1994.

Knoop, et al., "Efficient and Optimal Bit-Vector Dataflow Analysis: A Uniform Interprocedural Framework", Technical Report Bericht Nr. 9309, Instut Fur Informatik und Praktische Mathematik, Christian-Albrechts-Universitat Kiel, Germany, 1993.

Liang, et al., "Reuse-Driven Interprocedural Slicing in the Presence of Pointers and Recursion", International Conference on Software Maintenance, 1999.

Landi, et al., "Interprocedural Modification Side Effect Analysis with Pointer Aliasing", Proceedings of the 1993 ACM SIGPLAN Conference on Programming Language Designa nd Implementation, pp. 56-67, 1993.

Milanova, et al., "Precise and Efficient Call Graph Construction for C Programs with Function Pointers", Journal of Automated Software Engineering, pp. 12, 2004.

Nelson, et al., "Simplification by Cooperating Decision Procedures", TOPLAS: ACM Transactions on Programming Language and Systems, vol. 1, No. 2, pp. 245-257, 1979.

Pande, et al., "Interprocedural Def-Use Asosciations for C Systems with Single Level Pointers", IEEE Transactions on Software Engineering, vol. 20, No. 5, pp. 385-403, 1994.

Reps, et al., "Precise Interprocedural Data Flow Analysis via Graph Reachability", Conference Record on the Twenty-Second ACM Symposium on Principles of Programming Languages, 1995.

Shapiro, et al., "The Effects of the Precision of Pointer Analysis", LNCS 1302, 4th International Symposium on Static Analysis, Sep. 1997.

Olin Shivers, "Control-Flow Analysis of Higher-Order Languages", PhD Thesis, Camegie Mellon University, May 1991.

Sagiv, et al., "Parametric Shape Analysis via 3-Valued Logic", Conference Record of the Twenty-Sixth ACM Symposium on Principles of Programming Languages, 1999.

Bjarne Steensgaard, "Points-to Analysis in Almost Linear Time", Conference Record of the Twenty-Third ACM Symposium on Principles of Programming Languages, 1996.

Wilson, et al., "Efficient Context-Sensitive Pointer Analysis for C Programs", Proceedings of the ACM SIGPLAN 95 Conference on Programming Language Design and Implementation, 1995.

* cited by examiner

| | $v$ | Remove | Generate |
|---|---|---|---|
| 602 | x = CREATE() | { } | {x} |
| 604 | x = y | {x→*} ∪ (if (y ∉ must) {x} ∪ {z→f \| LocAlias(z→f,x)} ) | {x \| y ∈ must} ∪ {x→f \| y→f ∈ must} |
| 606 | x = &y | {x→*} ∪ {x} ∪ {z→f \| LocAlias(z→f,x)} | {x→NULL \| y ∈ must} |
| 608 | x = allocate() | {x→*} ∪ {x} ∪ {z→f \| LocAlias(z→f,x)} | { } |
| 610 | x = y→f | {x→*} ∪ (if (y→f ∉ must) {x} ∪ {z→g \| LocAlias(z→g,x)} ) | {x \| y→f ∈ must } |
| 612 | x = &(y→f) | {x→*} ∪ {x} ∪ {z→g \| LocAlias(z→g,x)} | {x→NULL \| y→f ∈ must} |
| 614 | x→f = y | {z→* \| LocAlias(x→f,z)} ∪ (if (y ∉ must) {x→f} ∪ {z→g \| LocAlias(x→f,z→g)} ∪ {z \| LocAlias(x→f,z)} ) | {x→f \| y ∈ must } |
| 616 | Other | {x \| LocAlias(x, Mods(v))} ∪ {x→f \| LocAlias(x, Mods(v)) ∨ LocAlias(x→f, Mods(v)) } | { } |

*Fig. 6*

| $v$ | Remove | Generate |
|---|---|---|
| x = CREATE() | { } | { x } |
| x = y | { x } | { x \| LocAlias(y, may) } |
| x = &y | { x } | { } |
| x = allocate() | { x } | { } |
| x = y→f | { x } | { x \| LocAlias(y→f, may) } |
| x = &(y→f) | { x } | { } |
| x→f = y | { } | { x→f \| LocAlias(y, may) } |
| Other | { } | { e \| (e ∈ Mods(v)) ∧ LocAlias(Refs(v), may) } |

SYSTEM AND METHOD FOR PERFORMING PATH-SENSITIVE VALUE FLOW ANALYSIS ON A PROGRAM

TECHNICAL FIELD

The subject matter relates generally to analysis of software programs and, in particular, to performing flow analyses.

BACKGROUND

Today, some software programs contain one million lines of code (LOC) or more. In order to ensure the reliability of these software programs, the software programs undergo testing before releasing the software programs to consumers. Typically, the testing includes a value flow analysis. Value flow analysis analyzes the software program to determine which memory locations hold a given value at a given program point along a given execution path within the program. The analysis then identifies code that incorrectly uses a value. For example, the analysis may check whether a function call has acquired a lock that was created by a preceding function call, whether a value is valid for a given function call, and the like. Because values created in one portion of the code may be passed to numerous other portions of the code, value flow analysis tracks each execution path for every value.

The current approaches for value flow analysis make a trade-off between precision and scalability. If the value flow analysis is precise, the analysis maintains information about all the values for each execution path. When the software program is very large, this precise value flow analysis can not compute the necessary information in a timely manner. Thus, precise value flow analysis does not scale well to large software programs. In contrast, imprecise value flow analysis does scale well to large software programs. However, imprecise value flow analysis does not keep accurate information. Rather, at certain locations within the program, the information is merged. Because, the imprecise value flow analysis merges some of the information, the results identify some portions of the code as having errors, when in fact those portions do not have errors. This reporting of incorrect errors is commonly referred to as noise. If the imprecise value flow analysis has too much noise, the analysis is not useful. Thus, full-scale reliable value flow analysis of a software program having a large code base has been unattainable.

SUMMARY

A method and system for performing path-sensitive value flow analysis on a software program is provided. Concrete state and value alias information is tracked along each statement and each relevant path in an abstract program and is stored as a symbolic state in a symbolic store. The value alias information includes a first set of aliases that identify aliases for a designated value that is being analyzed and a second set of aliases that identify possible aliases for the designated value. The value alias information is obtained using imprecise memory alias analysis. Along each relevant path for each statement, transforms are applied to the sets of aliases to update the first and second sets of aliases. The transforms are applied based on the type of statement being processed. Symbolic states existing at the same location are merged if the value alias information is identical within the symbolic states.

BRIEF DESCRIPTION OF THE DRAWINGS

FIG. 6 is a table illustrating transforms for updating a must set of the value alias information for use in FIG. 4.

FIG. 7 is a table illustrating transforms for updating a may set of the value alias information for use in FIG. 4.

DETAILED DESCRIPTION

Briefly stated, the present path-sensitive value flow analysis tracks the flow of values within source code written for a software program. The path-sensitive value flow analysis process maintains a concrete state of the program and value alias information for the program. The value alias information identifies a set of variables which are associated with a value being analyzed. The set of variables may be in one of two sets. A first set identifies the variables that "must" be associated with the analyzed value. The second set identifies the variables that "may" be associated with the analyzed value. The first and second sets are determined by performing transform functions based on the type of statement that is being processed in the software program.

Using the concrete state, the analysis determines which paths of a branch statement are relevant paths. Upon reaching a join point associated with the traversed relevant paths, the concrete states resulting from each relevant path are combined based on a comparison of the value alias information. The determination of the value alias information and the combining of the value alias information allow the present path-sensitive value flow analysis to scale to software programs with a large code base without experiencing exponential growth in the search space. Thus, the value flow analysis process provides accurate results for software programs having any size code base (e.g., a million LOCs).

The following description sets forth a specific embodiment of a path-sensitive value flow analysis process that incorporates elements recited in the appended claims. The embodiment is described with specificity in order to meet statutory requirements. However, the description itself is not intended to limit the scope of this patent. Rather, the inventors have contemplated that the claimed invention might also be embodied in other ways, to include different elements or combinations of elements similar to the ones described in this document, in conjunction with other present or future technologies.

Illustrative Operating Environment

Figure 1:
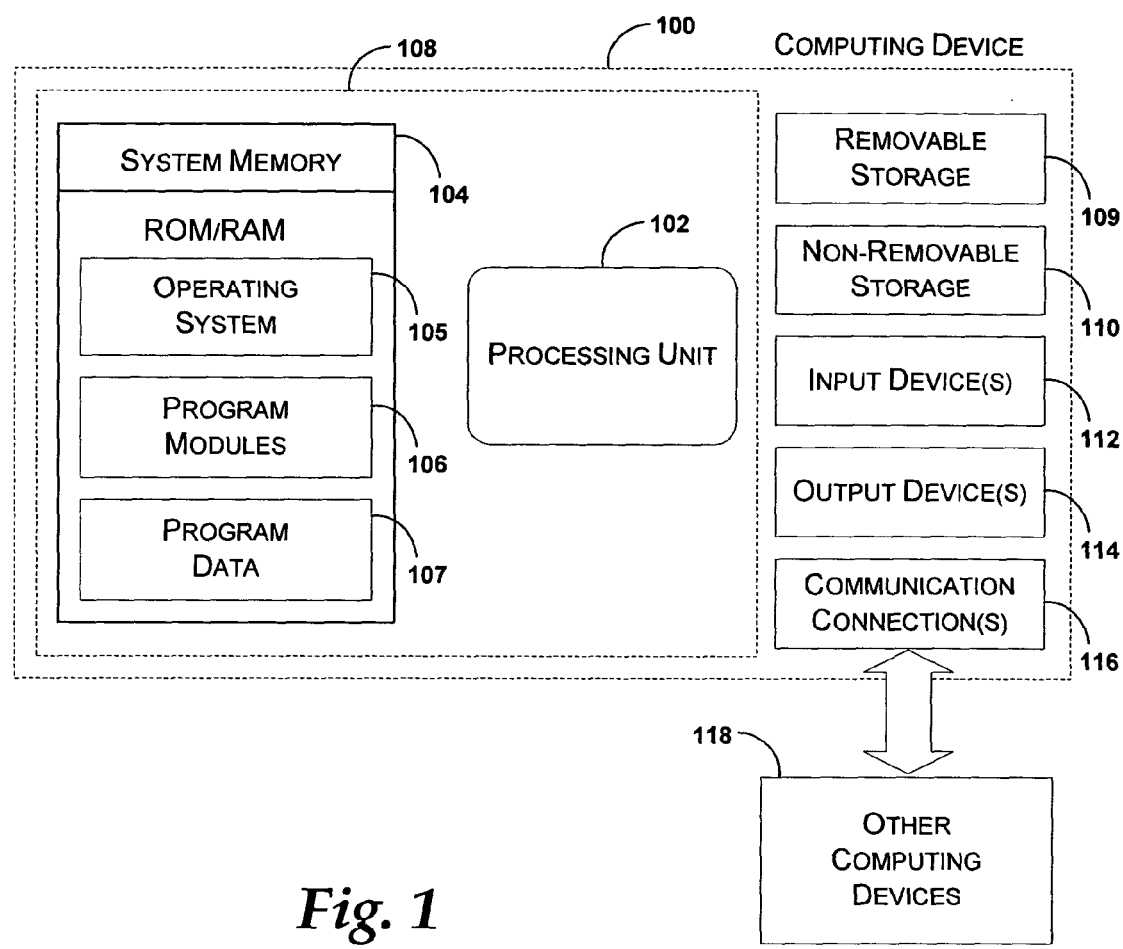
FIG. 1 illustrates an exemplary computing device that may be used in one exemplary embodiment of the path-sensitive value flow analysis.

With reference to FIG. 1, one exemplary system for implementing the path-sensitive value flow analysis includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device to communicate with other computing devices 118, such as over a network. Communication connections 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Value Flow Analysis Environment

Figure 2:
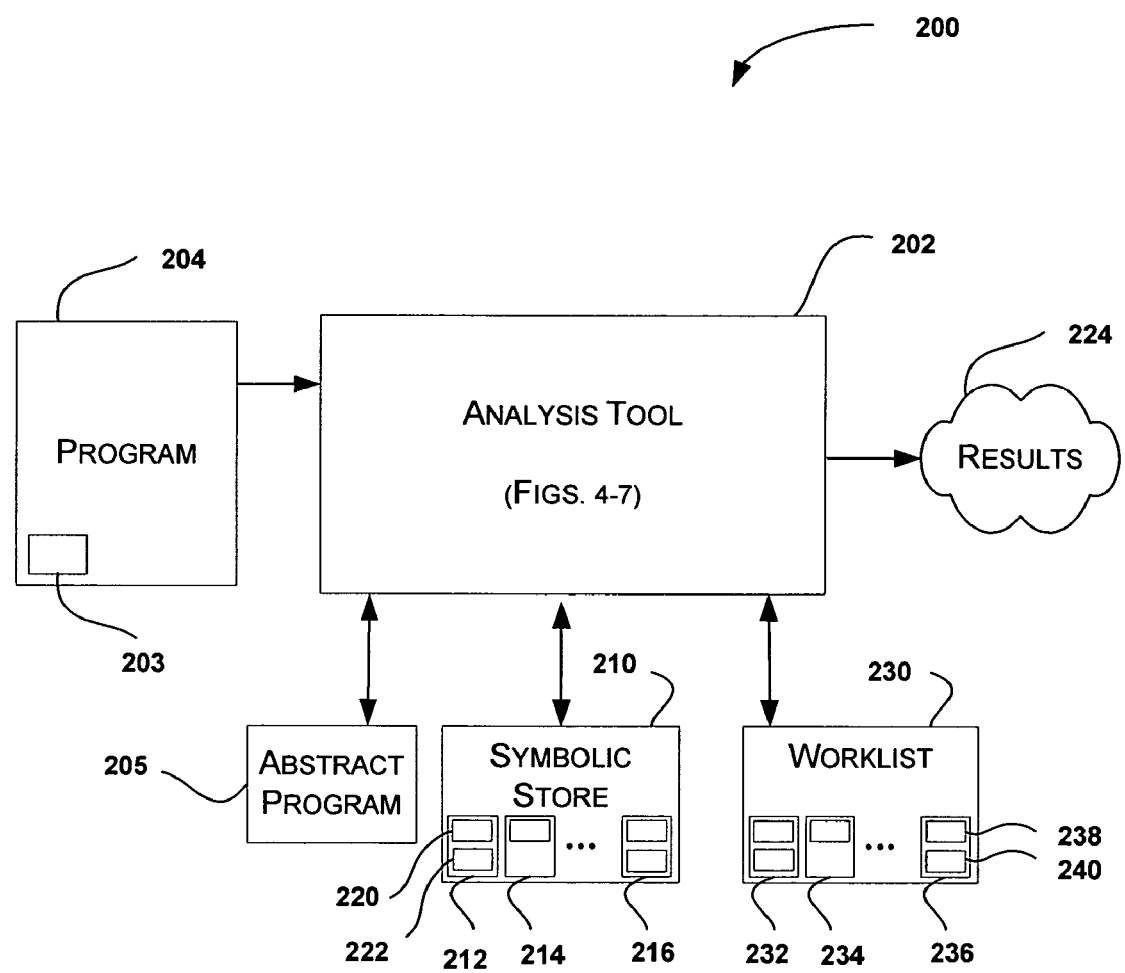
FIG. 2 is a block diagram illustrating an exemplary environment for practicing the path-sensitive value flow analysis.

FIG. 2 is a block diagram illustrating an exemplary environment for practicing the present path-sensitive value flow analysis. The exemplary environment shown in FIG. 2 is a value flow analysis environment 200. The goal in this value flow analysis environment 200 is to verify that the values assigned to variables (e.g., variable 203) within program 204 (i.e., source code) will operate properly in any reachable state. The value flow analysis environment 200 includes a value flow analysis tool 202. The value flow analysis tool 202 may operate as a stand-alone tool (i.e., a program module 106 in FIG. 1) or may operate within another software verification tool, such as a compiler application (not shown). The results from the value flow analysis tool may help identify errors within the software program, help stream-line a compile process, and the like. Program 204 may be written using any programming language, such as "C" programming language and the like.

In this value flow analysis environment 200, the value flow analysis tool 202 receives the program 204. The value flow analysis tool 202 or another tool translates the program 204 into an abstract program 205. The value flow analysis tool 202 then performs the path-sensitive value flow analysis process on the abstract program 205.

During the path-sensitive value flow analysis process, the value flow analysis tool 202 maintains a symbolic store 210 and may maintain a worklist 230. The symbolic store 210 and the worklist 230 may reside in RAM, on a hard disk, or on any other type of storage. The symbolic store 210 may include several symbolic states (e.g., symbolic states 212–216). Each symbolic state includes value alias information (e.g., 220). In addition, each symbolic state may include a concrete state (e.g., concrete state 222) associated with the value alias information. In general, the value alias information 220 identifies the variables in which the value being analyzed may currently be stored and the concrete state 222 identifies information on other properties, such as values of other variables. Each symbolic state is associated with some edge in a control flow graph.

Similarly, the worklist 230 may include several symbolic states (e.g., symbolic states 232–236) with each having value alias information (e.g., 238) and a concrete state (e.g. 240). Typically, the symbolic states 232–236 within the worklist 230 are a subset of the symbolic states 212–216 in the symbolic store 210. As will be described in detail below, the value flow analysis tool 202 uses the worklist 230 for determining which symbolic states still need to be processed. On the other hand, the symbolic store 210 is used to determine whether a newly created symbolic state must be merged with previously created states. The symbolic store is also used to determine whether any of the symbolic states indicate an error condition, once processing of the abstract program is complete.

The value flow analysis tool 202 traverses each relevant path in the abstract program 205. When any statement in the abstract program 205 affects the value being analyzed, the value flow analysis tool 202 updates the symbolic store 210 to accurately reflect the changes. The value flow analysis tool 202 outputs results 224 from processing. The results 224 may be incrementally output, outputted upon completion of the process, or the like. Briefly, as will be described in detail later in conjunction with FIGS. 3–5 and the related series of control flow graphs (CFGs) shown in FIGS. 8–10, the value flow analysis tool 202 performs concepts derived from dataflow analysis and includes a unique tracking of value alias information and an add heuristic that provides accurate results 224 without experiencing exponential search space explosion.

Value Flow Analysis Process

Figure 3:
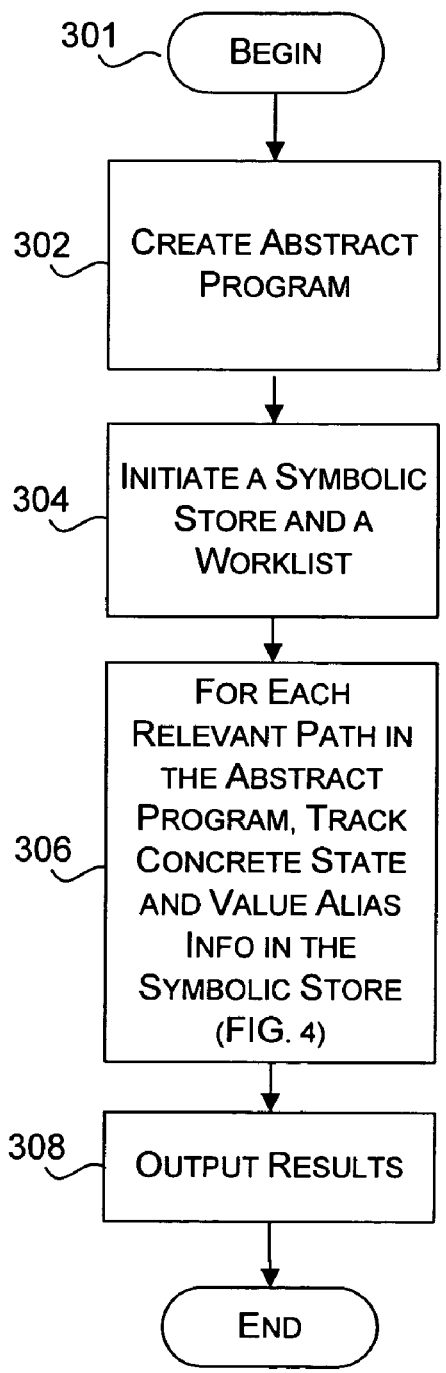
FIG. 3 is a logical flow diagram illustrating an overview of a path-sensitive value flow analysis process.

FIG. 3 is a logical flow diagram illustrating an overview of a path-sensitive value flow analysis process. The process enters at starting block 301, where the value flow analysis tool has been initiated in some manner (e.g., a variable is instantiated). The process 300 continues at block 302.

At block 302, an abstract program is created. In general, the abstract program is created by converting each statement in the software program 204 (FIG. 2) into one or more of the types of statements listed in the first column of Tables 600 and 700, illustrated in FIGS. 6 and 7, respectively. Therefore, one complex statement in the software program may become several statements in the abstract program. This conversion may be performed using various standard procedures, commonly referred to as "introducing temporaries" or "converting to three address form." Because those skilled in the art know of these various standard procedures, the procedures will not be discussed at length here. In summary, at block 302, the abstract program is created using standard procedures for converting complex statements within the software program into one or more simple statements. Once the abstract program is created, processing continues at block 304.

At block 304, a symbolic store is created and initialized. Typically, creating the symbolic store includes allocating memory and identifying a type of variable or structure. The symbolic store may take any number of forms. One form is a True-False lattice. In the True-False lattice, elements in the symbolic store are maps from variables V in the program to "true" or "false". Another illustrative form is a constant propagation lattice. In the constant propagation lattice, elements in the symbolic store are maps from variables V in the program to "true" or "false", integers, or floating-point values. Those skilled in the art will appreciate that other forms for the symbolic store may be implemented without departing from the scope of the claimed invention. Processing continues at block 306.

At block 306, each relevant path in the abstract program is traversed. During traversal of the relevant path, if the concrete state or the value alias information changes, the symbolic store may be updated to reflect the change. As will be described in detail below in conjunction with FIG. 4, the tracking process uses the symbolic store to determine whether a branch is relevant. As will be described, even when a branch affects the concrete state of the program, the statement may not be relevant to the value being analyzed. Therefore, the present path-sensitive value flow analysis does not traverse non-relevant paths and refrains from unnecessarily doubling the search space upon each branch statement. Processing continues at block 308.

At block 308, results from the value flow analysis process are output. The output may be in any form, such as a visual representation on a display, a file, or the like. A person responsible for testing the software program may then perform further analysis on the value being analyzed and correct any errors that are reported for the program. Processing then ends.

Figure 4:
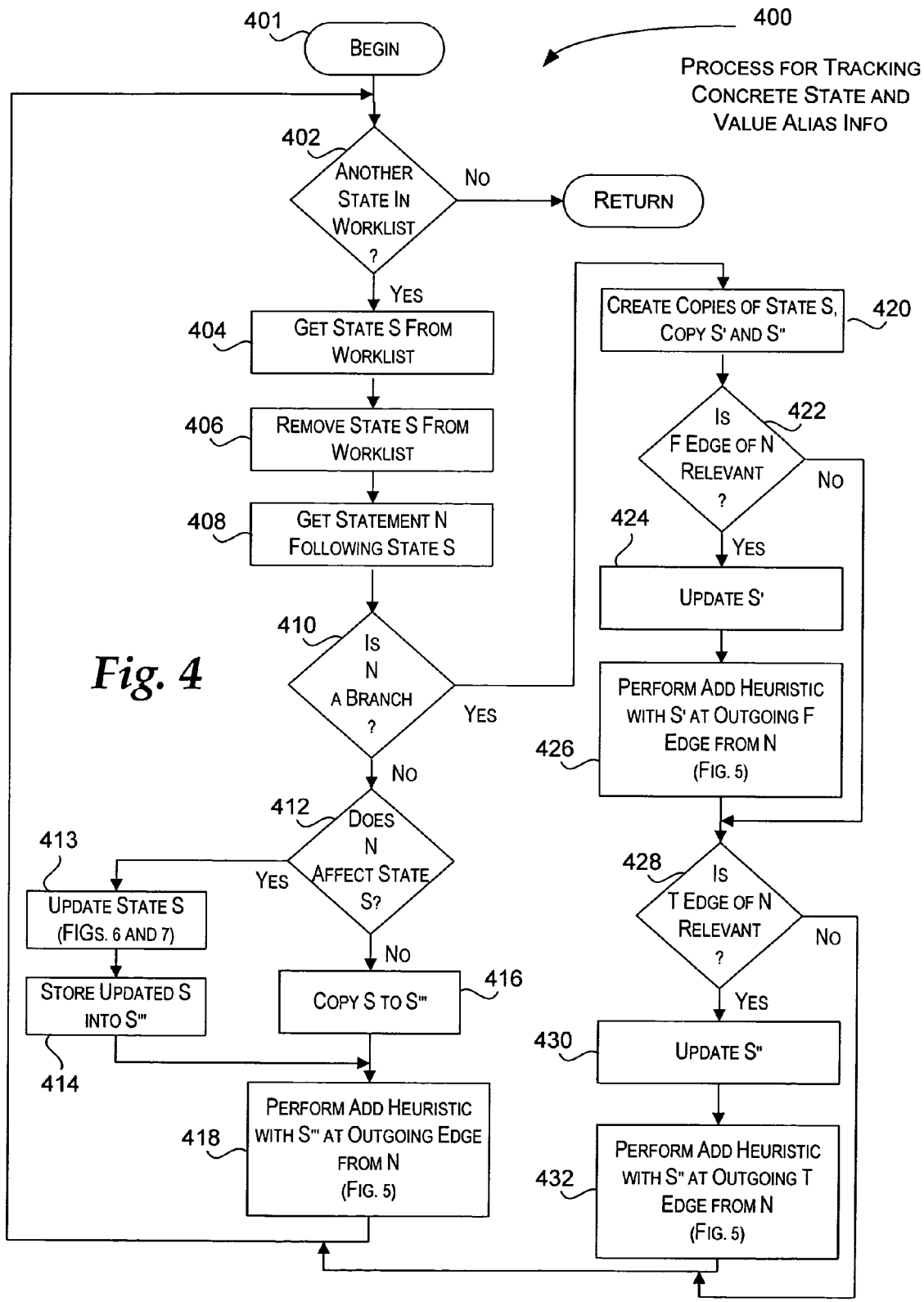
FIG. 4 is a logical flow diagram illustrating a process for tracking the concrete state and value alias information in the symbolic store for use in the path-sensitive value flow analysis process shown in FIG. 3.

FIG. 4 is a logical flow diagram illustrating a process for tracking the concrete state and the value alias information for the symbolic store for use in the path-sensitive value flow analysis process shown in FIG. 3. First, the flow of process 400 will be described, along with the flow of process 500 shown in FIG. 5. Next, the updating of the symbolic state will be described in conjunction with the tables in FIGS. 6 and 7. Finally, an example will be described in conjunction with logical flow diagrams 400 and 500, along with the control flow graphs illustrated in FIGS. 8–10.

Before describing process 400, terminology that is used throughout the following discussion is defined. A symbolic store is a collection of symbolic states that are encountered while processing the abstract program. As will be described in detail below, the present path-sensitive value flow analysis reduces the number of symbolic states that are stored in the symbolic store by applying a heuristic that first attempts to combine symbolic states before adding the symbolic states to the symbolic store. A worklist is a current working list of the symbolic states that still need processing. Memory aliasing is having two different names refer to the same location in memory. Memory aliasing occurs when pointers are used.

The process enters at starting block 401, after an abstract program has been created and an empty symbolic store and an empty worklist have been created. For convenience, the following discussion assumes that process 400 is an intra-procedural process having one function (e.g., main( )) in the program and does not have any function calls or returns. The value flow analysis tool enters the main( ) program. At this time, the symbolic store contains a single symbolic state that includes the value alias information associated with the value being analyzed. The inventors of the present path-sensitive value flow analysis discovered that distributive dataflow problems can be bit-vectorized. In addition, the inventors discovered that value flow analysis is distributive even in the presence of memory aliasing. Thus, process 400 analyzes one value of interest at a time, which reduces the memory footprint needed for value flow analysis. At this point, the worklist also contains the initial symbolic state (described below). The process 400 continues at decision block 402.

At decision block 402, a determination is made whether there is another symbolic state in the worklist. If there are no more symbolic states in the worklist, processing is complete and proceeds to a return block that proceeds back to FIG. 3. When processing is complete, if the symbolic store does not contain any symbolic state with an error, the results indicate that the value being analyzed was not used in any incorrect manner throughout the program. Thus, the program is ready for the next phase of testing. However, as long as there is another symbolic state in the worklist, processing continues at block 404.

At block 404, a symbolic state S is retrieved from the worklist. When the abstract program is first entered, typically, the worklist contains one symbolic state that specifies the default state. The default state lists one value alias (e.g., variable). The value assigned to this value alias is the value being analyzed. As will be described in detail below, the value may be assigned to other variables during various execution paths within the program. These other variables will then be added to the symbolic state. Thus, after processing several branch statements, the worklist may contain several symbolic states. Processing continues at block 406.

At block 406, the symbolic state S is removed from the worklist, because symbolic state S has been selected for processing. Thus, the worklist maintains a list of interim symbolic states that have not yet been selected for processing. Processing continues at block 408.

At block 408, a statement N is retrieved. The statement N is the statement that follows the edge associated with symbolic state S. For the following discussion, a statement is a node in the CFG. Nodes are produced for assignment statements, branch conditions, function calls, join points, return statements, and the like. The nodes are produced in a standard manner that is well known in the art, such as by breaking compound statements in the original program into individual statements in the abstract program. Processing continues to decision block 410.

At decision block 410, a determination is made whether the statement N is a branch statement. If statement N is not a branch statement, processing continues to decision block 412. At decision block 412, a determination is made whether statement N affects the value alias information or the concrete state of the symbolic state being processed. As mentioned above, the value alias information represents the memory locations in which the value being analyzed may be stored. The concrete state is associated with other aspects of the computation performed by the program, such as the values of other program variables. If the statement affects the symbolic state, processing continues to block 413.

At block 413, symbolic state S is updated. If the statement N affected the concrete state, the concrete state S is updated with the new information. For example, for the statement "x=0", block 413 will add "x=0" to the concrete state. The manner in which the concrete state is updated in the symbolic store is well known in the art and is not discussed at length here.

On the other hand, if the statement N affects the value alias information, the value alias information is updated in accordance with the present method. In general, the value alias information includes two sets of information. The first set (hereinafter also referred to as the Must set) represents the aliases in which the value being analyzed is stored. The second set (hereinafter also referred to as the May set) represents the aliases in which the value being analyzed may be stored. The union of the Must and the May set is over inclusive and represents all the locations in which the value may be stored. As will be described in detail in conjunction with FIGS. 6 and 7, the determination of the Must and May sets depends on the type of statement and the variables affected by the statement. Once the Must and May sets are updated and the symbolic state S is updated, processing continues at block 414.

At block 414, a new symbolic state (i.e., symbolic state S''') is created that contains symbolic state S with updated information. From block 414, processing continues to block 418.

Referring back to decision block 412, if the statement N does not affect the symbolic state S, processing proceeds to block 416. At block 416, a copy of symbolic state S is created (i.e., symbolic state S'''). Processing then also continues to block 418.

At block 418, the add heuristic of the present method is applied to the symbolic state S''' on the outgoing edge from statement N. The add heuristic (i.e., add process 500), described in detail below, is one of the reasons that the present path-sensitive value flow analysis achieves accurate analysis and achieves this accurate analysis even for large software programs, not just for small software programs. In general, the add process utilizes the value alias information and the concrete state to determine which symbolic states should be merged and to determine which symbolic states are copied into the symbolic store. The add process is described in detail below in conjunction with FIG. 5. Processing then loops back to decision block 402 for another symbolic state, if available.

Now, returning to decision block 410, if statement N is a branch statement, processing continues to block 420. At block 420, copies of the symbolic state (e.g., copies S' and S") are created for each path that may be traversed. Each path then updates its copy of the symbolic state as needed. Processing continues at decision block 422.

At decision block 422, a determination is made whether one of the edges (e.g., "false" edge) for statement N is relevant. This determination is based on the concrete state of symbolic state S. For example, if the symbolic state S contained "Flag=True" and the condition for the branch statement was "if Flag", the "T" edge of statement N would be relevant, but the "F" edge of statement N would not be relevant. When the edge is relevant, processing continues at block 424.

At block 424, the concrete state of the copied symbolic state S' is updated to reflect the knowledge that the branch condition is false. Because the process is proceeding down the false path of the branch statement, this knowledge is added to symbolic state S'. Processing continues at block 426.

The add heuristic at block 426 is similar to processing described above for block 418. However, the copy of the symbolic state S' is added to the outgoing "False" edge from statement N. The add process is described in detail below in conjunction with FIG. 5. Processing continues at decision block 428, as does the processing if decision block 422 concludes that the "False" edge is not relevant.

At decision block 428, a determination is made whether another edge (e.g., "True" edge) for statement N is relevant. Again, this determination is based on the concrete state of the current copy of symbolic state S (symbolic state S"). If the edge is relevant, processing continues at block 430.

At block 430, the concrete state of the copied symbolic state S" is updated to reflect the knowledge that the branch condition is true. This knowledge is added to symbolic state S" because the process is proceeding down the true path of the branch statement. Processing continues at block 432.

The add heuristic performed at block 432 is similar to processing described above for blocks 418 and 426. However, the copy of the symbolic state S" is added to the outgoing edge (e.g., "true" edge) from statement N. Again, the add process is described in detail below in conjunction with FIG. 5. Processing then loops back to decision block 402 for another symbolic state, if available.

While FIG. 4 illustrates a process 400 in which the decisional statement is a branch statement, other decisional statements may also be used. If these other decisional statements have more than two paths, additional copies of the symbolic store (block 420) are created and additional blocks similar to blocks 422–426 are added for each additional path. Each outgoing edge from a multi-way branch updates the symbolic state according to the condition under which program execution follows that branch. The add heuristic is now described in detail.

Figure 5:
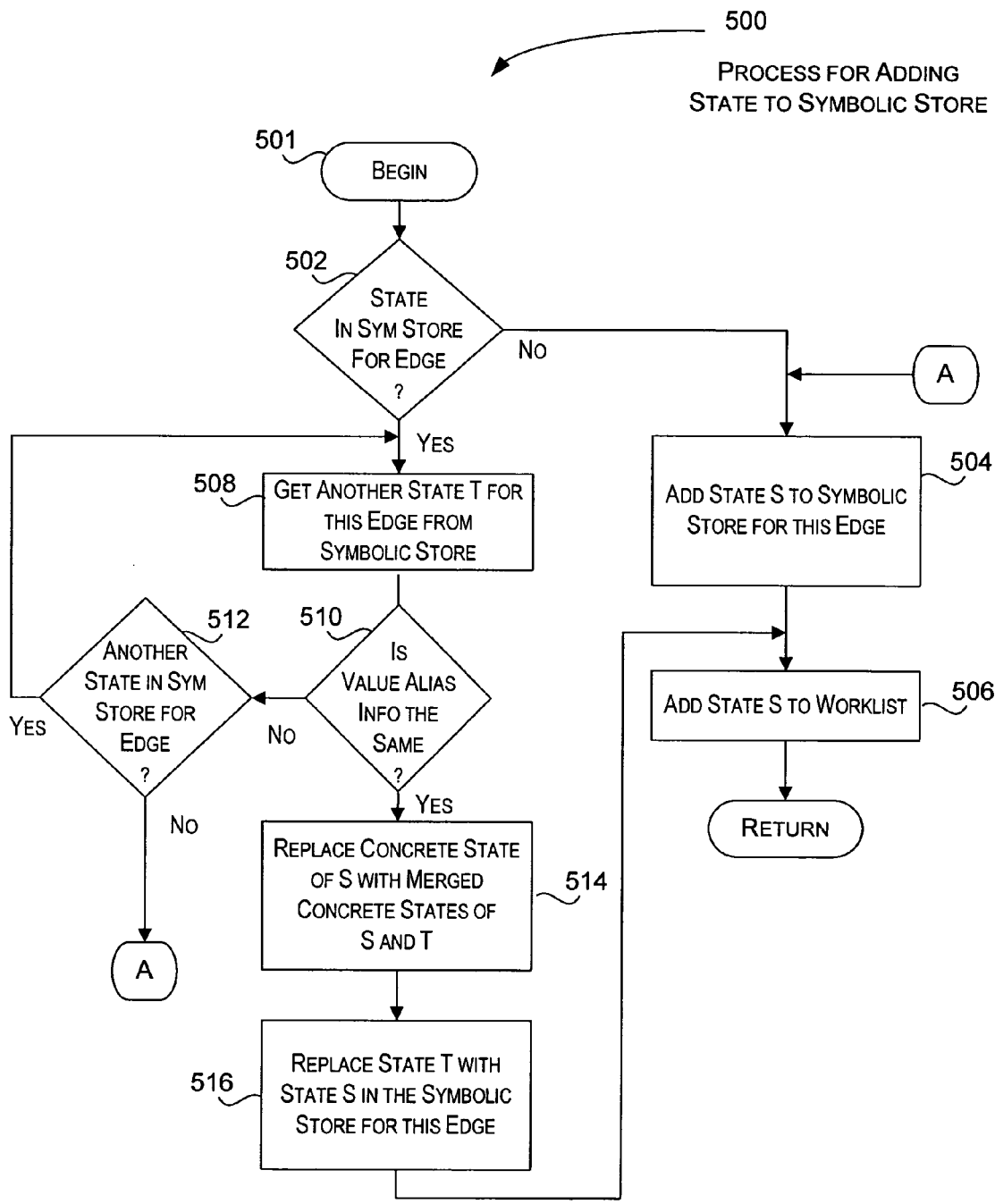
FIG. 5 is a logical flow diagram illustrating a process for adding symbolic states to the symbolic store for use in the tracking process illustrated in FIG. 4.

FIG. 5 is a logical flow diagram illustrating a process for adding symbolic states to the symbolic store. The process enters at starting block 501, after a symbolic state has been processed. Processing continues at decision block 502.

At decision block 502, a determination is made whether another symbolic state exists in the symbolic store for this particular edge. As mentioned above, the symbolic store may contain several symbolic states. Because branch statements sometimes cause two differing symbolic states to be stored in the symbolic store, one edge may have several symbolic states associated with it. The present path-sensitive value flow analysis attempts to merge these symbolic states whenever possible. Therefore, if any symbolic state exists in the symbolic store for the edge associated with statement N, processing continues at block 508. If no symbolic state exists in the symbolic store for the edge associated with statement N, symbolic state S is added to the symbolic store and to the worklist, at blocks 504 and 506, respectively.

At block 508, another symbolic state T for this edge is retrieved from the symbolic store. At decision block 510, a determination is made whether the value alias information for symbolic states S and T are the same. If the value alias information for the states are different, this indicates that the value being analyzed is different in the two symbolic states.

Therefore, the present path-sensitive value flow analysis does not merge the symbolic states. In this case, processing continues to decision block 512.

At decision block 512, a determination is made whether there is another symbolic state in the symbolic store for this edge. If there is, the process loops back to block 508 and proceeds as described above. However, if there is not another symbolic state for this edge, processing continues at block 504 where the symbolic state S is added to the symbolic store for this edge. The symbolic state S is added because it represents a symbolic state with new value alias information. This will occur whenever the "NO" branch from block 512 is reached. By reaching the "NO" branch, the process determines that the symbolic store does not currently contain any symbolic state with the same value alias information as that of symbolic state S. Thus, in accordance with the present method, the symbolic store will contain, at the most, one symbolic state for each value alias information possible at each edge. Whenever there are two symbolic states with the same value alias information at one edge, the present path-sensitive value flow analysis merges the two symbolic states into a merged symbolic state. The process then proceeds to block 506 where symbolic state S is added to the worklist. By adding the symbolic state to the worklist, the process ensures that symbolic state S will be carried forward in processing the remaining paths in the abstract program.

Referring back to decision block 510, if the determination concludes that the value alias information is the same, processing continues to block 514. At block 514, the contents of the concrete state in symbolic state S and symbolic state T are merged. In one embodiment, the merge is performed by deleting any information in the concrete state that is different between symbolic states S and T. Symbolic state S is updated with this merged concrete state. In addition, at block 516, symbolic state T in the symbolic store is replaced with the newly merged symbolic state S for this edge, thereby reducing the number of symbolic states in the symbolic store.

This merging of information and replacement of symbolic states in the symbolic store results in some information being lost. Thus, the precision of the path-sensitive value flow analysis process is decreased. However, the inventors of the present path-sensitive value flow analysis have recognized that as long as the relevant branching behavior is maintained, the accuracy of the present analysis is not appreciably reduced in comparison to the traditional very precise path-sensitive value flow analysis. This heuristic avoids exponential explosion of the search space while still capturing the relevant branching behavior. Therefore, software programs with large code bases may be analyzed with the present path-sensitive value flow analysis. Processing continues to block 506.

As described above, at block 506, the symbolic state S is added to the worklist. This "merged" symbolic state then becomes one of the symbolic states in the worklist and is used in further processing. One will note that the effect of the merging at block 514 is that for any edge, there will be only one symbolic state in the symbolic store per value alias sets. Therefore, the number of symbolic states in the symbolic store will not grow exponentially due to branches in the program. Processing then continues to return block and is complete.

FIG. 6 is a Table 600 illustrating transform functions for updating a Must set of the value alias information for use in block 413 of FIG. 4. For those familiar with dataflow analysis, Table 600 illustrates the Generate/Kill sets associated with the present process. Thus, Table 600 includes three columns; a first column (denoted with "v") identifies types of statements that the value flow analysis tool will encounter during processing of the value alias information. A second column (denoted with "Remove") represents the transfer function that is applied to the Must set in order to remove value aliases that are no longer value aliases for the analyzed value after processing the statement encountered in the first column. A third column (denoted with "Generate") represents the transfer function that is applied to the Must set in order to add value aliases that now store the value being analyzed.

Each row (e.g., rows 602–616) in Table 600 identifies the Remove transfer function (second column) and the Generate transfer function (third column) that are both associated with the type of statement (first column). Row 602 represents a special statement, "x=Create( )". This statement identifies the starting position for tracking a specific variable (e.g., "x"). When "x=Create( )" is encountered, the value alias information is the empty set. Thus, there are not any value aliases to remove, so the remove transfer function is the empty set. The generate transfer function adds the specific variable (i.e., "x").

Before explaining Table 600 in further detail, the symbols used within Table 600 will be explained. Two brackets "{ }" represents the empty set. An asterisk "*" represents a wildcard. An arrow "→" represents a pointer dereference. Thus, "x→*" represents all the fields that the pointer x may dereference. The symbol "y ∈ must" denotes that "y" is a member of the Must set. In contrast, the symbol "y ∉must" denotes that "y" is not a member of the Must set. The standard union symbol "∪" denotes that the actions on both the right side and the left side of the union statement are performed. For example, "{x→*} ∪ {x}" represents that all the fields that the pointer x may dereference and the variable x should be considered. A conditional is denoted with "|" symbol. The statement to the right of the "|" symbol is the conditional, and the statement to the left of the "|" symbol is the action. Thus, "x |y ∈ must" states that if the variable "y" is a member of the Must set before the statement is encountered, the variable "x" is added or removed from the Must set depending on whether the transfer function is the Remove or Generate function.

The function "LocAlias(x→f,x)" checks whether the two passed arguments (i.e., x→f and x) point to the same memory location. The function will return a TRUE if the arguments both refer to the same memory location. In general, the LocAlias ( ) function is over-inclusive and is commonly referred to as a scalable memory alias analysis. Memory alias analysis is well known in the art. Additional information on one technique for memory alias analysis may be obtained from "*Unification-based pointer analysis with directional assignments*", in Proceedings of the ACM SIGPLAN 2000 Conference on Programming Language Design and Implementation, 2000, by Manuvir Das. The function "Mods(v)" identifies all the memory cells (locations) that are updated by the statement v. The function "Refs(v)" identifies all the memory cells (locations) that were looked up when executing the statement v. Both of these functions, Mods(v) and Refs(v), are well known to those skilled in that art and are not discussed here at length.

As mentioned earlier, the first column identifies different types of statements that the value flow analysis tool will encounter during processing of the abstract program. Row 604 is a statement that assigns the value of one variable to another variable (e.g., x=y). Row 606 is a statement that assigns an address of one variable to another variable (e.g., x=&y). Row 608 is a statement that allocates memory and assigns the result to a variable (e.g., x=allocate( )). Row 610 is a statement that assigns a value from a field dereferenced from one variable to another variable (e.g., x=y→f). Row 612 is a statement that assigns an address of a field pointed to by one variable to another variable (e.g., x=&(y→f). Row 614 is a statement that assigns a value of a variable to a field dereferenced by another variable (e.g., x→f=y). Row 616 represents the statements, other than the statements described in rows 602–614.

The statements will now be described in order to explain Table 6. Row 604 is associated with a scalar to scalar assignment statement (e.g., "x=y"). For the exemplary statement, the value of the variable "y" is copied into the variable "x". The generate function is a union of two sets of information, the first set states that if the variable "y" is currently a member of the Must set, add the variable "x" to the Must set. This is done because if the variable "y" already contained the value being analyzed, the variable "x" now contains the same value. The other set states that if a field (e.g., "f") dereferenced by pointer "y" is a member of the Must set, add the field (e.g., "f") that can be dereferenced by pointer "x" to the Must set. This is done because if "y" was a pointer, after assigning "y" to "x", "x" will point to the same memory locations as the "y" pointer.

The remove transfer function is also the union of two sets of information. The first set states that all the fields that can be dereferenced with x need to be removed from the Must set. The second set has a conditional with a union. The conditional is based on whether the variable y was a member of the Must set when the statement was encountered. If the variable y was a member of the Must set, no value aliases are removed. However, if the variable y was not a member of the Must set, the variable to the left of the assignment (i.e., "x") is removed. In addition, if "z→f" and "x" reference the same memory location, the value alias "z→f" is removed.

This occurs because if "x" was in the Must set before the statement was encountered, once the value of the variable "y" is assigned to the variable "x", the variable "x" only needs to be tracked if the variable "y" was in the Must set. Otherwise, the variable "x" is no longer of interest for analyzing the value flow. Likewise, any value alias of "x" should be removed.

For row 606, the generate transfer function adds the value alias "x→NULL" if the variable y was in the Must set before encountering the statement. The remove transfer function removes any field that x previously dereferenced (e.g., x→*), the variable itself (e.g., x), and any memory location (e.g., z→f) that pointed to the same memory location as the variable that was assigned (e.g., x).

For row 608, the generate transfer function does not add any additional value aliases. The remove transfer function removes any field that x previously dereferenced (e.g., x→*), the variable itself (e.g., x), and any memory location (e.g., z→f) that pointed to the same memory location as the variable that was assigned (e.g., x).

For row 610, the generate transfer function adds the value alias "x" if the field referenced by variable y (e.g., y→f) was in the Must set before encountering the statement. The remove transfer function removes any field that x previously dereferenced (e.g., x→*). In addition, the remove transfer function removes the variable itself (e.g., x) and any memory location (e.g., z→g) that pointed to the same memory location as the variable that was assigned (e.g., x), if the assigned field (e.g., y→f) was not a member of the Must set before the statement was encountered.

For row 612, the generate transfer function adds the value alias "x→NULL" if the field pointed to by variable y (e.g., y→f) was in the Must set before encountering the statement. The remove transfer function removes any field that x previously dereferenced (e.g., x→*), the variable itself (e.g., x), and any memory location (e.g., z→g) that pointed to the same memory location as the variable that was assigned (e.g., x).

For row 614, the generate transfer function adds the left-hand variable (e.g., x→f) if the right-hand variable (e.g., y) was in the Must set before encountering the statement. The remove transfer function removes any fields pointed to by a variable (e.g., z→*) if the variable (e.g., z) previously pointed to the same memory location as the left-hand variable (e.g., x→f). In addition, the remove transfer function removes the left-hand variable (e.g., x→f) if the right-hand variable (e.g., y) was not in the Must set before encountering the statement. The remove transfer function also removes any memory locations that pointed to the same memory as the left-hand variable (e.g., {z→g|LocAlias (x→f, z→g)} and {z|LocAlias(x→f,z)}) if the right-hand variable (e.g., y) was not in the Must set before the statement was encountered.

For row 616, the generate transfer function does not add any alias information. The remove transfer function removes any variable (e.g., x) that pointed to the same memory location as a memory cell that was updated by the statement (e.g., LocAlias(x, Mods(v))}. In addition, the remove transfer function removes any field (e.g., x→f) if the memory cell updated by the statement (determined by Mods(v)) pointed to the same memory location as the field (x→f) or the pointer (x) (e.g., {x→f|LocAlias(x, Mods(v)) v LocAlias (x→f, Mods(v)) }).

In general, the inventors of the present path-sensitive value flow analysis discovered that even though these memory alias analyses tend to be inaccurate, their results may be used to rule out a large number of irrelevant assignments through pointers. In addition, instead of introducing all possible memory aliases into the value alias information, the present analysis uses a placeholder which can then be expanded using memory alias analysis on demand. Thus, by implicitly representing the value alias sets, precise value flow analysis and imprecise memory alias analysis may be combined to create a feasible path-sensitive value flow analysis.

FIG. 7 is a table illustrating transform functions for updating the May set of the value alias information for use in block 413 of FIG. 4. Similar to Table 6, Table 700 includes three columns; a first column (denoted with "v") identifies types of statements that the value flow analysis tool will encounter during processing of the abstract state. A second column (denoted with "Remove") represents the transfer function that is applied to the May set in order to remove value aliases that are no longer value aliases for the analyzed value after processing the statement encountered in the first column. A third column (denoted with "Generate") represents the transfer function that is applied to the May set in order to add value aliases that may now store the value that is being analyzed.

The different types of statement listed in the first column of Table 700 correspond to the types of statements listed in the first column of Table 600. Therefore, the following will describe the generate and remove transfer functions for each of the different types of statements.

For row 704, the generate transfer function adds the left-hand variable (e.g., x) if the right-hand variable (e.g., y) pointed to the same memory location as any alias in the May set (e.g., LocAlias(y, may)). The remove transfer function removes the left-hand variable (e.g., x).

For rows 706, 708, and 712, the generate transfer function does not add an alias to the May set. The remove transfer function removes the left-hand variable (e.g., x).

For row 710, the generate transfer function adds the left-hand variable (e.g., x) if the right-hand variable (e.g., y→f) pointed to the same memory location as any alias in the May set (e.g., LocAlias(y→f, may)). The remove transfer function removes the left-hand variable (e.g., x).

For row 714, the generate transfer function adds the left-hand variable (e.g., x→f) if the right-hand variable (e.g., y) pointed to the same memory location as any alias in the May set (e.g., LocAlias(y, may)). The remove transfer function does not remove any value aliases.

For row 716, the generate transfer function adds an expression (e.g., e) if the expression (e.g., e) was updated by the statement (e.g., e ∈ Mods(v)) or if one of the memory locations looked up when executing the statement pointed to a memory location in the May set (e.g., LocAlias(Refs(v), may)).

Upon reviewing the transfer functions for the May set, one will note that the transfer functions do not add all the memory aliases to the May set, rather, the May set implicitly represents its memory aliases. Therefore, the Remove transfer functions do not remove expressions from the May set due to an assignment, except for variables.

Figure 8:
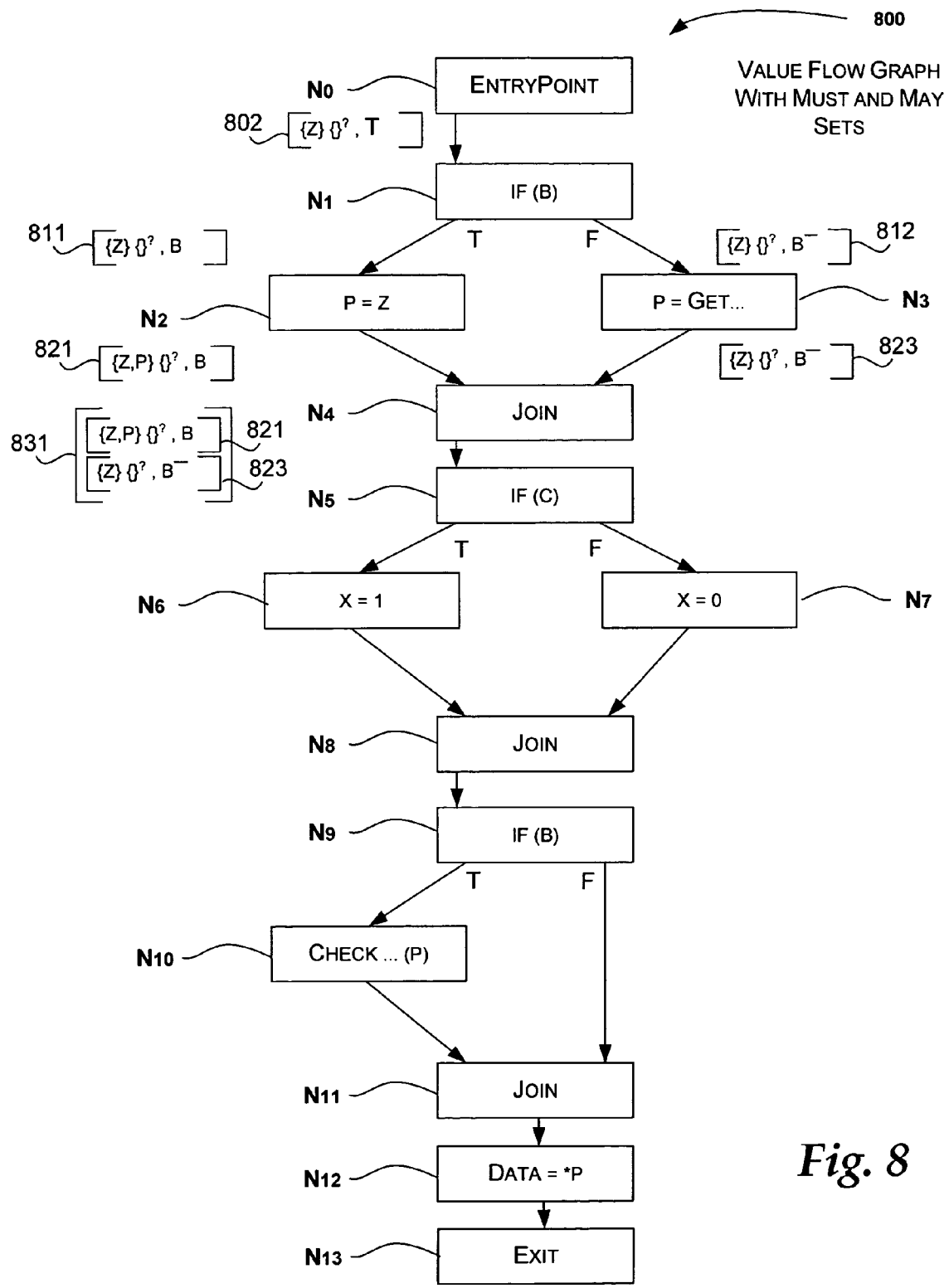
FIGS. 8–10 are a series of control flow graphs that represent the logic of an exemplary software program and illustrate the symbolic states at various points along the control flow graph during the path-sensitive value flow analysis process.
Figure 9:
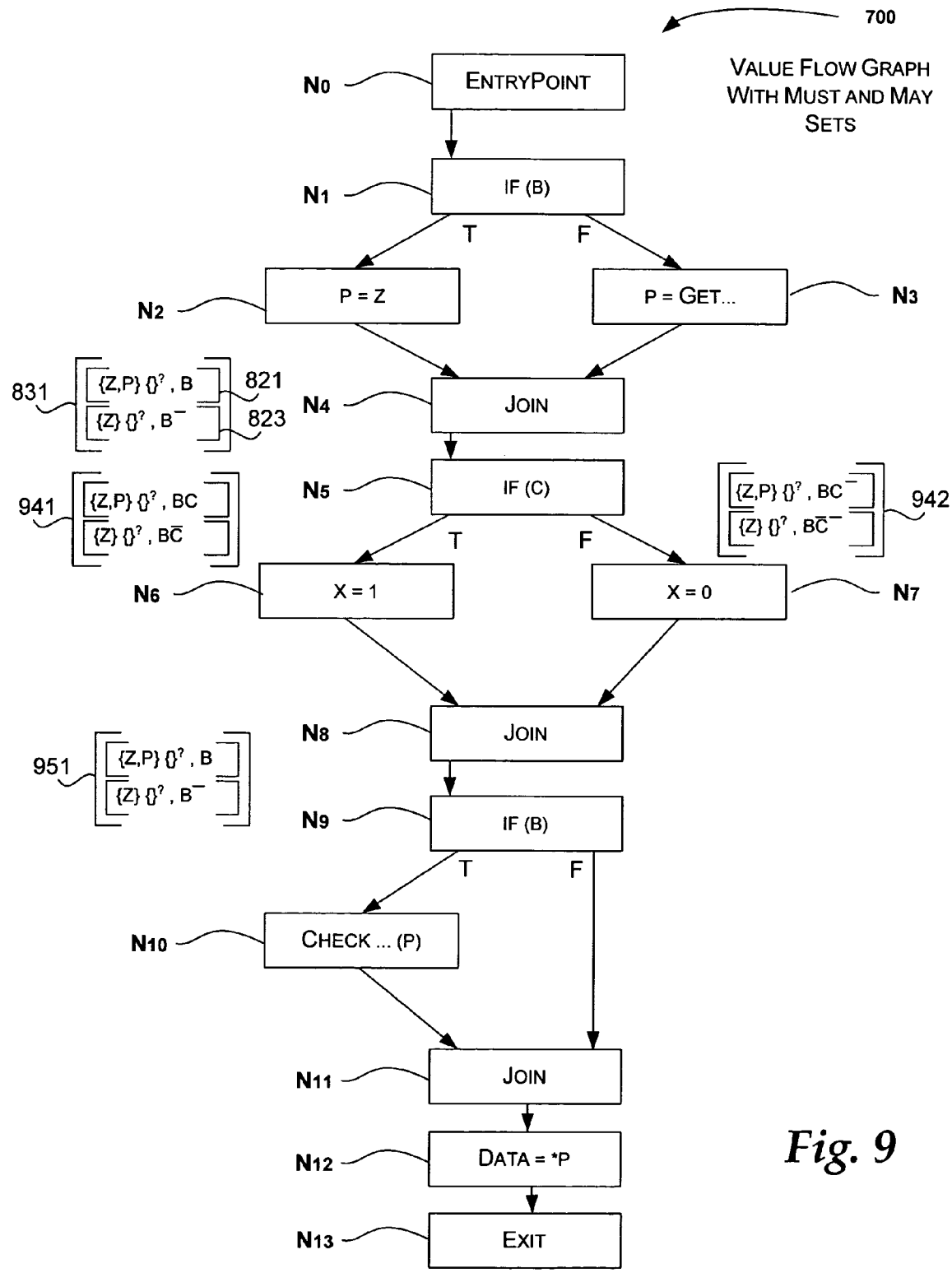
Figure 10:
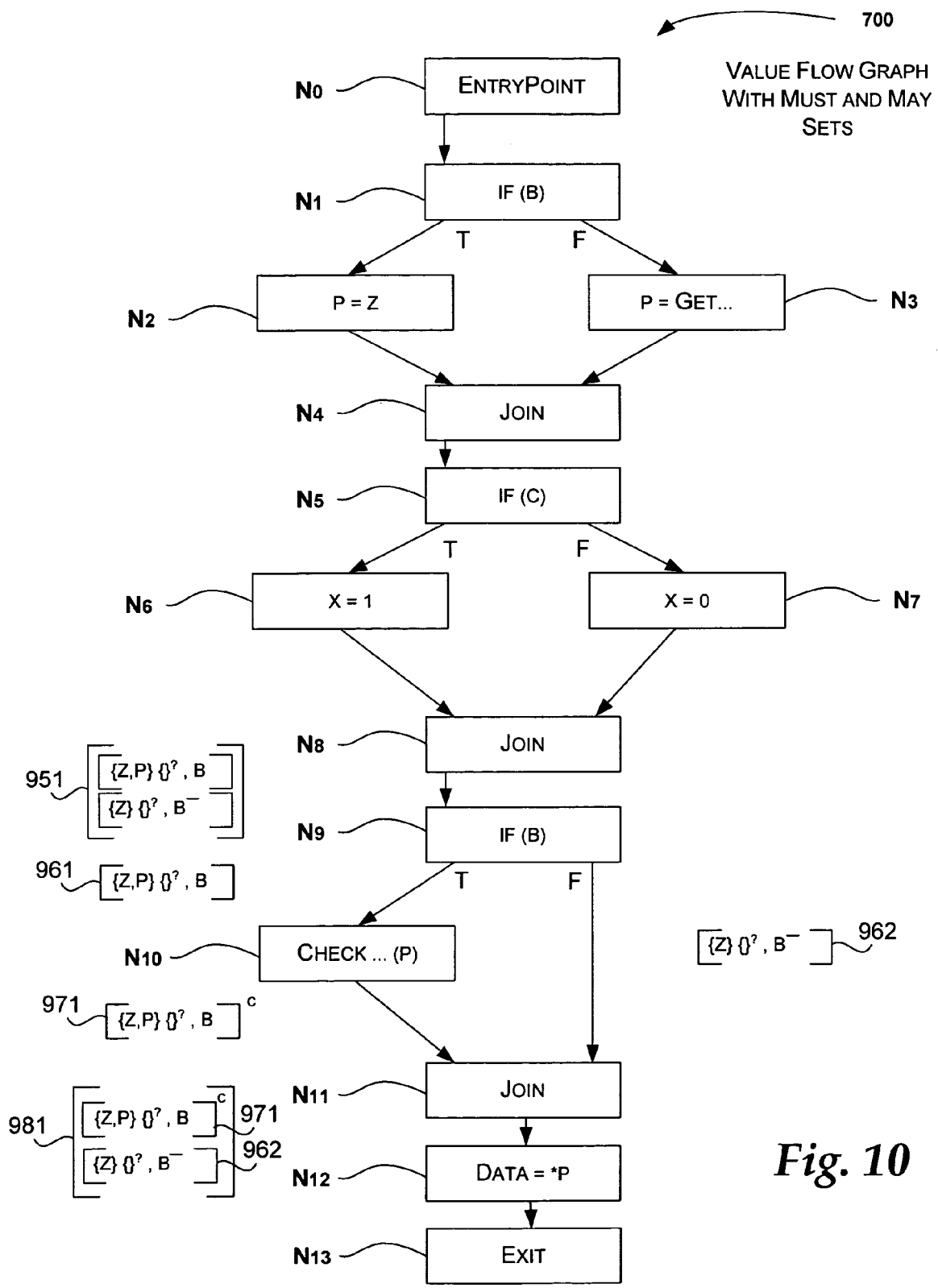

Now, the flow of process 400 and process 500 will be described in conjunction with the control flow graphs shown in FIGS. 8–10 and the transfer functions shown in FIGS. 6–7. Briefly, the control flow graphs shown in FIGS. 8–10 are identical and visually represent the abstract program created from the source code shown in Table 1 below.

TABLE 1

```
void entryPoint(int *o) {
    if(b)
        p=o;
    else
        p = getPointer( );
    if(c)
        x=1;
    else
        x=0;
    if(b)
        checkPointer(p);
    data = *p;
}.
End of Table 1.
```

Control flow graph 800 includes fourteen nodes N0–N13. Each node is associated with one of the statements in the source code shown in Table 1. In essence, control flow graph 800 provides a visual representation of the abstract program created in block 302 of FIG. 3. As shown in Table 1, the program includes one function named entryPoint( ) that is passed an argument "z". Thus, the following discussion of the example source code describes the process for tracking the concrete and value alias information with respect to the flow of the value initially stored in variable "z". The join points (e.g., nodes N4, N8, and N11) associated with each branch statement (e.g., nodes N1, N5, and N9) are explicitly identified in the CFG.

The process enters the entryPoint( ) program (begin block 401) represented by node N0 in FIG. 8. Prior to entering entryPoint( ) or upon entering entryPoint( ), the assignment statement "create( )" is specified for the variable "z". Referring to FIGS. 6 and 7, rows 602 and 702 for the Must and May sets, respectively, the generate functions for both the Must and May sets are applied. After applying the generate function for the Must set, the Must set contains the variable "z". One will note that the generate function for May set also adds the variable "z" to the May set. However, because the Must set already includes the variable "z", the variable is not included in the May set. At this node, the symbolic store and the worklist both contain one symbolic state (e.g., symbolic state 802), which includes the variable being analyzed (e.g., "z") and an open concrete state indicating that there are no current variables that will limit the execution paths. Thus, the symbolic state 802 is shown having the value alias information of "z" in the Must set (denoted by braces without the question mark) and an empty set in the May set (denoted by braces with the question mark) and an open concrete state. The process 400 continues at block 402.

At block 402, a determination is made whether there is a symbolic state in the worklist. As stated above, there is currently one symbolic state (e.g., symbolic state 802). Therefore, symbolic state 802 is retrieved from the worklist (block 404) and removed from the worklist (block 406). At this point, the worklist does not contain any symbolic states. Processing continues to block 408.

At block 408, a statement is retrieved that follows the symbolic state 802 (i.e., "if (b)" at node N1 in FIG. 8). Because this statement is a branch (decision block 410), two copies (not shown) of symbolic state 802 are created (block 420). The symbolic state 802 does not rule out proceeding through the "false" path (decision block 422). Therefore, the "false" edge of the "if (b)" statement is relevant for symbolic state 802. The first copy of the symbolic state 812 is updated with the predicate of the branch statement (i.e., "b=0" indicated in FIG. 8 with a line over "b") (block 424). Because there are not any other symbolic states associated with the "false" edge (decision block 502), symbolic state 812 is added to the symbolic store (block 504) and added to the worklist (506).

Likewise, the symbolic state 802 does not rule out proceeding through the "true" path (decision block 428). Therefore, the "true" edge of the "if(b)" statement is relevant for symbolic state 802. The second copy of the symbolic state 811 is updated with the predicate of the branch statement (i.e., "b=1") (block 430). Again, because there is not another symbolic state associated with "true" edge (decision block 502), symbolic state 811 is added to the symbolic store (block 504) and added to the worklist (506). At this time, the symbolic store contains symbolic states 802, 811, and 812. The worklist contains symbolic states 811 and 812.

Returning to decision block 402, either one of these symbolic states from the worklist may be retrieved. Assume that symbolic state 811 is retrieved (block 404) and removed (block 406) from the worklist. The "p=z" statement at node N2 is retrieved (block 408). The "p=z" statement is not a branch (decision block 410), but does affect the symbolic state of 811. Therefore, symbolic state 811 is updated (block 413). Updating symbolic state 811 involves applying the Must and May transfer functions applicable to the "p=z" statement. Thus, the transfer functions in rows 604 and 704 are applied. Applying the transfer functions for the Must set (row 604) adds the variable "p" to the Must set because the variable "z" was in the Must set prior to the statement. Applying the transfer functions for the May set (row 704) adds no additional value alias because the May set was empty before the statement. Thus, after applying the transfer functions for the Must and May sets, symbolic state 821 results (block 414). Because there is not any other symbolic state in the symbolic store for outgoing edge of node N2

(decision block 502), symbolic state 821 is added to the symbolic store (block 504) and added to the worklist (block 506). At this time, the symbolic store contains symbolic states 802, 811, 812, and 821. The worklist contains symbolic states 812 and 821.

Returning to decision block 402, either one of these symbolic states may be retrieved. Assume that symbolic state 812 is retrieved (block 404) and removed (block 406). The "p=getPointer( )" statement at node N3 is retrieved (block 408). The "p=getPointer( )" statement is not a branch (decision block 410), and does not affect the symbolic state of 812. Therefore, symbolic state 811 is copied to symbolic state 823 (block 416). Again, because there is not a symbolic state in the symbolic store for the edge (block 502), Symbolic state 823 is added to the symbolic store (block 504) and added to the worklist (block 506). At this time, the symbolic store contains symbolic states 802, 811, 812, 821, and 823. The worklist contains symbolic states 821 and 823.

Returning to decision block 402, either one of these symbolic states may be retrieved from the worklist. Assume that symbolic state 821 is retrieved (block 404) and removed (block 406). The join statement at node N4 is retrieved (block 408). The join statement is not a branch (decision block 410), and does not affect the symbolic state 821. Therefore, symbolic state 821 is copied to symbolic state 831 (block 416). Because there is not a symbolic state in the symbolic store for the edge (block 502), symbolic state 831 is added to the symbolic store 841 for this edge (block 504) and added to the worklist (block 506). At this time, the symbolic store contains symbolic states 802, 811, 812, 821, 823, and 831. The worklist contains symbolic states 823 and 831.

Returning to decision block 402, there is another symbolic state (symbolic state 823) in the worklist. Symbolic state 823 is retrieved (block 408) and removed (block 406). The join statement at node N4 is retrieved (block 408). Because the join statement is not a branch statement (decision block 410) and does not affect the symbolic state 823, processing proceeds to decision block 502 in FIG. 5. However, this time there is a symbolic state in the symbolic store for the join state at node N4 (i.e., symbolic state 831). Thus, symbolic state 831 is retrieved (block 508). Because the value alias information is different (decision block 510) and there is not another symbolic state in the symbolic store for this edge (decision block 512), symbolic state 823 is added to the symbolic store (block 504) and to the worklist (block 506) as symbolic state 841. Thus, node N4 merges the incoming facts and keeps the execution states of b and not b separate because the associated value alias sets are different. Thus, at this point, the symbolic store contains symbolic states 802, 811, 812, 821, 823, and 841. The worklist contains symbolic states 841. It is important to note that traditional data flow analysis would have merged all the execution states into one, thereby losing precision compared with the present process.

One will note that the processing of each symbolic state at each node may proceed independently. The add heuristic will properly update the symbolic store at the appropriate time. Therefore, in this embodiment, the process does not have to completely finish both paths of a branch statement before continuing with the join statement and before processing other statements.

The symbolic state 841 that is in the worklist is then processed through process 400 and 500 and the newly created symbolic states are added to the worklist. The newly created symbolic states are also processed through process 400 and 500. FIGS. 9–10 illustrate the symbolic states that occur at each node. Without being unnecessarily duplicative, the following discussion only describes the determination of the Must and May set for each statement and does not walk through the entire processing for merging the symbolic states at join statements. One skilled in the art can easily expand on the foregoing example illustrated in FIG. 8 and described above to create the symbolic states shown in FIGS. 9–10.

At node N5, given that either b is "0" or "1", the process can determine that one of the branches is irrelevant. Therefore, the execution state is duplicated and one copy traverses through each branch. The statement "if(c)" affects only the concrete state of the symbolic state 841 by adding "C=1" or just "C" to the concrete state (see symbolic state 941). Likewise, the statement "if(c)" affects the concrete state of the symbolic state 841 by adding "c=0" to the concrete state (see symbolic state 942). The Must set and the May set are not changed after applying the transfer functions identified in rows 616 and 716, respectively. Thus, both of the symbolic states, symbolic states 941 and 942 are propagated to the true and false successors of node N5, respectively.

Again, at node N6 and N7, only the concrete state is affected by adding the value of "x" to the concrete state. Because these nodes do not affect the value alias information, the symbolic states for these nodes were omitted.

At node N8, the symbolic states 941 and 942 are merged based on the value alias set. The resulting symbolic state 951 states that either the Must set is {z,p} and the May set is empty when b is true, or the Must set is {z} and the may set is empty when b is false. Thus, the process dropped the value of "c" from the execution state because it was not correlated with the value alias set for the value of interest. This is in contrast with traditional path-sensitive value flow analysis which would have continued tracking c accurately and double the number of execution states that were analyzed downstream of node N8.

At node N9, FIG. 10, the process determines that only one leg of the branch is feasible: true for state b and false for not b. Thus, the symbolic states 961 and 962 are propagated to the true and false successors of node N9, respectively.

At node N10, FIG. 10, symbolic state 961 indicates that "p" holds the tracked value. Therefore, the call to CheckPointer( ) performs the check on the tracked value, and the resulting symbolic state 971 is marked as checked (indicated with a superscript "c"). Again, this is in contrast with traditional data flow analysis which would have only indicated the variable "p" may hold the tracked value. Therefore, using traditional data flow analysis, symbolic state 971 would not have been able to be marked as checked.

At node N11, FIG. 11, symbolic states 962 and 971 are merged to create symbolic state 981. At node N12, the variable "p" is dereferenced (e.g., data=*p). Two states may reach this statement. Symbolic state 971 states that the variable "p" holds a pointer that has been checked. Therefore, the dereference at node N12 is valid. The other symbolic state 962 states that the variable "p" does not hold a user-mode pointer. Therefore, the dereference is valid. Using traditional, data flow analysis, the dereference would have been invalid and a false error would have been reported.

As one skilled in the art will appreciate, the present path-sensitive value flow analysis also operates with nested decisional statements or loop constructs. The inner nests, along with their symbolic stores, are processed before proceeding with any outer nests. In addition, for the above discussion, the intraprocedural aspect of the present analysis is described in detail. The present path-sensitive value flow analysis also operates in an interprocedural manner. For programs with multiple procedures and calls between procedures, the analysis produces a combined CFG by combining the CFGs of individual procedures, in a manner that is well known in the art. For example, edges are added that connect a call site with the entry point of the called function, and that connect the exit point of the called function with a corresponding return node for the call site. Processing is as in the intraprocedural case, except that symbolic states are not merged at the exit points of functions. Instead, the information at exit points is stored as a mapping from a symbolic state at the entry point to the resulting symbolic state at the exit point.

Thus, as described above, the path-sensitive value flow analysis tracks the flow of values through a program and eliminates value flow information from infeasible execution paths. Thus, the analysis scales easily to a million lines of code and is path-sensitive. As described above, the analysis achieves these results by tracking the flow of one value at a time, merging value flow information from different execution paths if the value flow information is the same, and applying complex aliasing information in a manner so that not all memory aliases need to be added.

Although details of specific implementations and embodiments are described above, such details are intended to satisfy statutory disclosure obligations rather than to limit the scope of the following claims. Thus, the invention as defined by the claims is not limited to the specific features described above. Rather, the invention is claimed in any of its forms or modifications that fall within the proper scope of the appended claims, appropriately interpreted in accordance with the doctrine of equivalents.

The invention claimed is:

1. A method for performing path-sensitive value flow analysis on an abstract program, the abstract program having a plurality of statements that are derived from complex statements coded within a software program, the method comprising:
   tracking a concrete state and value alias information for each statement along each relevant path in the abstract program;
   storing the concrete state and value alias information for each statement along each relevant path in a symbolic store, the symbolic store storing a plurality of symbolic states, each symbolic state comprising the concrete state at a specific location along a specific relevant path in the abstract program and the value alias information at the specific location along the specific relevant path, the value alias information being associated with a designated value that is being analyzed;
   upon encountering a decisional statement, proceeding individually along each decision path associated with the decisional statement as long as the concrete state in the symbolic state being processed at the decisional statement reflects that the decision path is relevant; and
   merging two symbolic states in the symbolic store if the two symbolic states exist for the same specific location in the abstract program and if the value alias information in the two symbolic states are identical.

2. The method of claim 1, wherein the two symbolic states are merged by deleting information in the concrete state of both symbolic states if the information differs between the two symbolic states.

3. The method of claim 1, wherein the value alias information is obtained using imprecise memory alias analysis.

4. The method of claim 1, wherein the value alias information includes a first set of aliases that identify aliases for the designated value and a second set of aliases that identify possible aliases for the designated value.

5. The method of claim 4, wherein the second set of aliases is over-inclusive.

6. The method of claim 4, wherein the first set and second set of aliases are determined by performing transform functions on the first and second set of aliases based on a type of statement that is being processed in the abstract program.

7. The method of claim 6, wherein the type of statement includes an initial statement, the transform functions for the first set of aliases include a generate transfer function and a remove transfer function, the generate transfer function adds the variable X to the first set of aliases, the remove transfer function is the empty set.

8. The method of claim 6, wherein the type of statement includes a scalar assignment in which a variable Y is assigned to a variable X, the transform functions for the first set of aliases include a generate transfer function and a remove transfer function, the generate transfer function adds the variable X to the first set if the variable Y was in the first set before the statement and adds a field pointed to by variable X to the first set if the field derefenced by variable Y was in the first set before the statement, the remove transfer function removes fields referenced by the variable X, and removes the variable X and any field that points to the same memory location as variable X, if the variable Y was not in the first set before the statement.

9. The method of claim 6, wherein the type of statement includes an assignment in which an address of variable Y is assigned to a variable X, the transform functions for the first set of aliases include a generate transfer function and a remove transfer function, the generate transfer function adds the dereference of variable X to the first set if the variable Y was in the first set before the statement, the remove transfer function removes fields referenced with the variable X, removes the variable X, and removes any field that points to the same memory location as variable X.

10. The method of claim 6, wherein the type of statement includes a call to a memory allocation function with a return value assigned to a variable X, the transform functions for the first set of aliases include a generate transfer function and a remove transfer function, the generate transfer function is an empty set, the remove transfer function removes fields referenced with the variable X, removes the variable X, and removes any field that points to the same memory location as variable X.

11. The method of claim 6, wherein the type of statement includes an assignment in which a field F pointed to by variable Y is assigned to a variable X, the transform functions for the first set of aliases include a generate transfer function and a remove transfer function, the generate transfer function adds the variable X to the first set if the field F pointed to by the variable Y was in the first set before the statement, the remove transfer function removes fields referenced by the variable X, and removes the variable X and any field that points to the same memory location as variable X, if the variable Y was not in the first set before the statement.

12. The method of claim 6, wherein the type of statement includes an assignment in which an address of a field F referenced by variable Y is assigned to variable X, the transform functions for the first set of aliases include a generate transfer function and a remove transfer function, the generate transfer function adds the dereference of variable X to the first set if the field F referenced by variable Y was in the first set before the statement, the remove transfer function removes fields referenced with the variable X, removes the variable X, and removes any field that points to the same memory location as variable X.

13. The method of claim 6, wherein the type of statement includes an assignment in which a variable Y is assigned to a field F referenced by variable X, the transform functions for the first set of aliases include a generate transfer function and a remove transfer function, the generate transfer function adds the field F referenced by variable X if the variable Y was in the first set before the statement, the remove transfer function removes any field referenced by a variable Z such that the variable Z refers to the same memory location as the field F referenced by the variable X, and if the variable Y was not in the first set, removes the field F referenced by the variable X, any field that points to the same memory location as the field F referenced by the variable X, and any variable that refers to the same memory location as the field F referenced by the variable X before the statement.

14. The method of claim 6, wherein the transform functions for the type of statement include a generate transfer function and a remove transfer function for determining the first set of aliases, the generate transfer function is the empty set, the remove transfer function removes any variable that pointed to the same memory location as a memory cell that was updated by the statement and removes any field if the memory cell updated by the statement pointed to the same memory location as the field or the pointer.

15. The method of claim 6, wherein the type of statement includes an initial statement, the transform functions for the second set of aliases include a generate transfer function and a remove transfer function, the generate transfer function adds the variable X to the second set of aliases, the remove transfer function is the empty set.

16. The method of claim 6, wherein the type of statement includes a scalar assignment in which a variable Y is assigned to a variable X, the transform functions for the second set of aliases include a generate transfer function and a remove transfer function, the generate transfer function adds the variable X to the second set if the variable Y refers to the same memory location as one of the aliases in the second set of aliases before the statement, the remove transfer function removes the variable X.

17. The method of claim 6, wherein the type of statement includes an assignment in which an address of variable Y is assigned to a variable X, the transform functions for the second set of aliases include a generate transfer function and a remove transfer function, the generate transfer function is the empty set, the remove transfer function removes the variable X from the second set.

18. The method of claim 6, wherein the type of statement includes a call to a memory allocation function with a return value assigned to a variable X, the transform functions for the second set of aliases include a generate transfer function and a remove transfer function, the generate transfer function is the empty set, the remove transfer function removes the variable X from the second set.

19. The method of claim 6, wherein the type of statement includes an assignment in which a field F pointed to by variable Y is assigned to a variable X, the transform functions for the second set of aliases include a generate transfer function and a remove transfer function, the generate transfer function adds the variable X if the field F pointed to by variable Y refers to the same memory location as one of the aliases in the second set of aliases before the statement, the remove transfer function removes the variable X from the second set of aliases.

20. The method of claim 6, wherein the type of statement includes an assignment in which an address of a field F referenced by variable Y is assigned to variable X, the transform functions for the second set of aliases include a generate transfer function and a remove transfer function, the generate transfer function is the empty set, the remove transfer function removes the variable X from the second set.

21. The method of claim 6, wherein the type of statement includes an assignment in which a variable Y is assigned to a field F referenced by variable X, the transform functions for the second set of aliases include a generate transfer function and a remove transfer function, the generate transfer function adds the field F referenced by variable X to the second set if the variable Y refers to the same memory location as one of the aliases in the second set before the statement, the remove transfer function is the empty set.

22. The method of claim 6, wherein the transform functions for the type of statement include a generate transfer function and a remove transfer function for determining the second set of aliases, the generate transfer function adds an expression if the expression was updated by the statement or if one of the memory locations looked up when executing the statement pointed to a memory location in the second set of aliases, the remove transfer function is the empty set.

23. A computer-readable storage media having computer executable instructions, the instructions performing a method of path-sensitive value flow analysis, the method comprising:
tracking a concrete state for each statement along each relevant path in an abstract program;
tracking value alias information for each statement along each relevant path in the abstract program, wherein the value alias information is determined by applying transform functions based on a type of statement that is being processed in the abstract program the value alias information comprising a first set of aliases that identify aliases for a designated value that is being analyzed and a second set of aliases that identify possible aliases for the designated value, a portion of the value alias information being obtained using imprecise memory alias analysis;
storing the concrete state and value alias information for each statement as one of a plurality of symbolic states; and
merging two symbolic states if two symbolic states exist for a specific location in the abstract program and if the value alias information in the two symbolic states are identical.

24. The computer-readable storage media of claim 23, wherein the type of statement includes an initial statement, the transform functions for the first set of aliases include a generate transfer function and a remove transfer function, the generate transfer function adds the variable X to the first set of aliases, the remove transfer function is the empty set.

25. The computer-readable storage media of claim 23, wherein the type of statement includes a scalar assignment in which a variable Y is assigned to a variable X, the transform functions for the first set of aliases include a generate transfer function and a remove transfer function, the generate transfer function adds the variable X to the first set if the variable Y was in the first set before the statement and adds a field pointed to by variable X to the first set if the field derefenced by variable Y was in the first set before the statement, the remove transfer function removes fields referenced by the variable X, and removes the variable X and any field that points to the same memory location as variable X, if the variable Y was not in the first set before the statement.

26. The computer-readable storage media of claim 23, wherein the type of statement includes an assignment in which an address of variable Y is assigned to a variable X, the transform functions for the first set of aliases include a generate transfer function and a remove transfer function, the generate transfer function adds the dereference of variable X to the first set if the variable Y was in the first set before the statement, the remove transfer function removes fields referenced with the variable X, removes the variable X, and removes any field that points to the same memory location as variable X.

27. The computer-readable storage media of claim 23, wherein the type of statement includes a call to a memory allocation function with a return value assigned to a variable X, the transform functions for the first set of aliases include a generate transfer function and a remove transfer function, the generate transfer function is an empty set, the remove transfer function removes fields referenced with the variable X, removes the variable X, and removes any field that points to the same memory location as variable X.

28. The computer-readable storage media of claim 23, wherein the type of statement includes an assignment in which a field F pointed to by variable Y is assigned to a variable X, the transform functions for the first set of aliases include a generate transfer function and a remove transfer function, the generate transfer function adds the variable X to the first set if the field F pointed to by the variable Y was in the first set before the statement, the remove transfer function removes fields referenced by the variable X, and removes the variable X and any field that points to the same memory location as variable X, if the variable Y was not in the first set before the statement.

29. The computer-readable storage media of claim 23, wherein the type of statement includes an assignment in which an address of a field F referenced by variable Y is assigned to variable X, the transform functions for the first set of aliases include a generate transfer function and a remove transfer function, the generate transfer function adds the dereference of variable X to the first set if the field F referenced by variable Y was in the first set before the statement, the remove transfer function removes fields referenced with the variable X, removes the variable X, and removes any field that points to the same memory location as variable X.

30. The computer-readable storage media of claim 23, wherein the type of statement includes an assignment in which a variable Y is assigned to a field F referenced by variable X, the transform functions for the first set of aliases include a generate transfer function and a remove transfer function, the generate transfer function adds the field F referenced by variable X if the variable Y was in the first set before the statement, the remove transfer function removes any field referenced by a variable Z such that the variable Z refers to the same memory location as the field F referenced by the variable X, and if the variable Y was not in the first set, removes the field F referenced by the variable X, any field that points to the same memory location as the field F referenced by the variable X, and any variable that refers to the same memory location as the field F referenced by the variable X before the statement.

31. The computer-readable storage media of claim 23, wherein the transform functions for the type of statement include a generate transfer function and a remove transfer function for determining the first set of aliases, the generate transfer function is the empty set, the remove transfer function removes any variable that pointed to the same memory location as a memory cell that was updated by the statement and removes any field if the memory cell updated by the statement pointed to the same memory location as the field or the pointer.

32. The computer-readable storage media of claim 23, wherein the type of statement includes an initial statement, the transform functions for the second set of aliases include a generate transfer function and a remove transfer function, the generate transfer function adds the variable X to the second set of aliases, the remove transfer function is the empty set.

33. The computer-readable storage media of claim 23, wherein the type of statement includes a scalar assignment in which a variable Y is assigned to a variable X, the transform functions for the second set of aliases include a generate transfer function and a remove transfer function, the generate transfer function adds the variable X to the second set if the variable Y refers to the same memory location as one of the aliases in the second set of aliases before the statement, the remove transfer function removes the variable X.

34. The computer-readable storage media of claim 23, wherein the type of statement includes an assignment in which an address of variable Y is assigned to a variable X, the transform functions for the second set of aliases include a generate transfer function and a remove transfer function, the generate transfer function is the empty set, the remove transfer function removes the variable X from the second set.

35. The computer-readable storage media of claim 23, wherein the type of statement includes a call to a memory allocation function with a return value assigned to a variable X, the transform functions for the second set of aliases include a generate transfer function and a remove transfer function, the generate transfer function is the empty set, the remove transfer function removes the variable X from the second set.

36. The computer-readable storage media of claim 23, wherein the type of statement includes an assignment in which a field F pointed to by variable Y is assigned to a variable X, the transform functions for the second set of aliases include a generate transfer function and a remove transfer function, the generate transfer function adds the variable X if the field F pointed to by variable Y refers to the same memory location as one of the aliases in the second set of aliases before the statement, the remove transfer function removes the variable X from the second set of aliases.

37. The computer-readable storage media of claim 23, wherein the type of statement includes an assignment in which an address of a field F referenced by variable Y is assigned to variable X, the transform functions for the second set of aliases include a generate transfer function and a remove transfer function, the generate transfer function is the empty set, the remove transfer function removes the variable X from the second set.

38. The computer-readable storage media of claim 23, wherein the type of statement includes an assignment in which a variable Y is assigned to a field F referenced by variable X, the transform functions for the second set of aliases include a generate transfer function and a remove transfer function, the generate transfer function adds the field F referenced by variable X to the second set if the variable Y refers to the same memory location as one of the aliases in the second set before the statement, the remove transfer function is the empty set.

39. The computer-readable storage media of claim 23, wherein the transform functions for the type of statement include a generate transfer function and a remove transfer function for determining the second set of aliases, the generate transfer function adds an expression if the expression was updated by the statement or if one of the memory locations looked up when executing the statement pointed to a memory location in the second set of aliases, the remove transfer function is the empty set.

40. A system for performing path-sensitive value flow analysis on an abstract program, the abstract program having a plurality of statements that were derived from complex statements coded within a software program, the system comprising:
- a processor; and
- a memory into which a plurality of instructions are loaded, the plurality of instructions performing a method comprising:
- tracking a concrete state and value alias information for each statement along each relevant path in the abstract program;
- storing the concrete state and value alias information for each statement along each relevant path in a symbolic store, the symbolic store storing a plurality of symbolic states, each symbolic state comprising the concrete state at a specific location along a specific relevant path in the abstract program, the value alias information at the specific location along the specific relevant path, the value alias information being associated with a designated value that is being analyzed;
- upon encountering a decisional statement, proceeding individually along each decision path associated with the decisional statement as long as the concrete state in the symbolic state at the decisional statement reflects that the decision path is relevant; and
- merging two symbolic states in the symbolic store if the two symbolic states exist for the same specific location in the abstract program and if the value alias information in the two symbolic states are identical.

41. The system of claim 40, wherein the two symbolic states are merged by deleting information in the concrete state of both symbolic states if the information differs between the two symbolic states.

42. The system of claim 40, wherein the value alias information is obtained using imprecise memory alias analysis.

43. The system of claim 40, wherein the value alias information includes a first set of aliases that identify aliases for the designated value and a second set of aliases that identify possible aliases for the designated value.

44. The system of claim 43, wherein the second set of aliases is over-inclusive.

45. The system of claim 43, wherein the first set and second set of aliases are determined by performing transform functions on the first and second set of aliases based on a type of statement that is being processed in the abstract program.

* * * * *

UNITED STATES PATENT AND TRADEMARK OFFICE
CERTIFICATE OF CORRECTION

PATENT NO. : 7,089,537 B2  Page 1 of 1
APPLICATION NO. : 10/662942
DATED : August 8, 2006
INVENTOR(S) : Manuvir Das et al.

It is certified that error appears in the above-identified patent and that said Letters Patent is hereby corrected as shown below:

On page 2, in Item (56), under "Other Publications", in column 1, line 26, delete "Porgram" and insert -- Program --, therefor.

On page 2, in Item (56), under "Other Publications", in column 1, line 34, delete "teh" and insert -- the --, therefor.

On page 2, in Item (56), under "Other Publications", in column 1, line 47, delete "Depedence" and insert -- Dependence --, therefor.

On page 2, in Item (56), under "Other Publications", in column 2, line 7, delete "Generallsed" and insert -- Generalized --, therefor.

On page 2, in Item (56), under "Other Publications", in column 2, line 21, delete "Designa nd" and insert -- Design and --, therefor.

On page 2, in Item (56), under "Other Publications", in column 2, line 28, delete "Asosciations" and insert -- Associations --, therefor.

On page 2, in Item (56), under "Other Publications", in column 2, line 39, delete "Camegie" and insert -- Carnegie --, therefor.

In The Claims:

In column 18, line 22, in Claim 8, delete "derefenced" and insert -- dereferenced --, therefor.

In column 20, line 65, in Claim 25, delete "derefenced" and insert -- dereferenced --, therefor.

Signed and Sealed this

Twenty-seventh Day of July, 2010

David J. Kappos
*Director of the United States Patent and Trademark Office*